United States Patent [19]
Warren et al.

[11] Patent Number: 5,786,015
[45] Date of Patent: Jul. 28, 1998

[54] METHOD FOR PRODUCING FOOD GRADE POULTRY OIL AND MEAL

[75] Inventors: Eugene Warren, Morton; John M. Rogers, Sr., Brandon; Scott Cooper, Pelahatchie; Greg Butler, Morton, all of Miss.

[73] Assignee: B. C. Rogers Poultry, Inc., Morton, Miss.

[21] Appl. No.: 628,110

[22] Filed: Apr. 9, 1996

[51] Int. Cl.$^6$ .................. A23L 1/311; A23L 1/312; A23L 1/315
[52] U.S. Cl. .................. 426/417; 426/438; 426/644
[58] Field of Search .................. 426/417, 438, 426/644

[56] References Cited

U.S. PATENT DOCUMENTS

| | | |
|---|---|---|
| 2,019,547 | 11/1935 | Theobald . |
| 3,295,982 | 1/1967 | Hickey et al. . |
| 3,345,353 | 10/1967 | Klubien . |
| 3,346,393 | 10/1967 | Bradford . |
| 3,733,202 | 5/1973 | Marmor ............ 426/438 X |
| 4,361,590 | 11/1982 | Wojcik ............. 426/480 |
| 4,366,749 | 1/1983 | Caridis et al. ...... 426/438 X |
| 4,392,420 | 7/1983 | Caridis et al. ...... 426/438 X |
| 4,491,602 | 1/1985 | Miller .............. 426/417 X |
| 4,565,709 | 1/1986 | Berge et al. ....... 426/641 |
| 4,699,796 | 10/1987 | Belshaw et al. .... 426/438 |
| 4,923,705 | 5/1990 | Mottur et al. ...... 426/438 |

*Primary Examiner*—Arthur L. Corbin
*Attorney, Agent, or Firm*—Jacobson, Price, Holman & Stern, PLLC

[57] ABSTRACT

A method and apparatus for producing increased protein chicken meal. Scrap chicken parts are loaded into a cooking vat that is 40 feet long by 5 feet wide by 4 feet deep, with a system of moving chain conveyors and paddles. These conveyors move the scrap chicken parts at a predetermined speed through oil maintained at a temperature of approximately 360° to 380° F. for the entire length of the vessel, and dump the scrap chicken parts at the opposite end of entry. Oil is circulated through the vat at a rate of approximately 680 to 860 gallons per minute (gpm) to allow for the rapid removal of fat and moisture from skin and meat in a continuous process. The scrap chicken parts are removed from the vat and pressed to form poultry oil. Subsequently, the scrap chicken parts are broken up to form a high protein chicken meal.

14 Claims, 3 Drawing Sheets

METHOD FOR PRODUCING FOOD GRADE POULTRY OIL AND MEAL

FIELD OF THE INVENTION

The present invention relates to the rendering of food grade poultry oil and meal, from the leaf fat, skin, necks and backs of chicken carcasses. The overall arrangement includes an improved apparatus for carrying out this method as well as a new system of product flow.

BACKGROUND OF THE INVENTION

Various practices have been performed in the past to produce a usable product from the scraps of slaughtering operations. Examples of some of these practices are found in U.S. Pat. No. 2,019,547 to Theobald, U.S. Pat. No. 3,295,982 to Hickey et al., U.S. Pat. No. 3,345,353 to Klubien, U.S. Pat. No. 3,346,393 to Bradford, U.S. Pat. No. 4,361,590 to Wojcik and U.S. Pat. No. 4,565,709 to Berge et al.

SUMMARY OF THE INVENTION

Accordingly, it is an object of the present invention to provide a method and apparatus for producing increased protein chicken meal. This object is accomplished by initially having all product to be rendered delivered to a cooking facility in portable vats. The delivered product is maintained at a temperature below 55° F. This assures that all end products produced will meet U.S. Department of Agriculture food requirements.

Product is then loaded into a mechanical dumper, which in turn loads product onto a variable speed belt. Product that contains bones and gristle are sent through a rough chopper or screen. The acceptable product is then moved by conveyor to and dumped into a cooking vat at a rate of approximately 10,000 to 12,000 pounds per hour.

The cooking vat is a vessel that is 40 feet long by 5 feet wide by 4 feet deep, with a system of moving chain conveyors and paddles. These conveyors move the product at a predetermined speed through oil maintained at a temperature of approximately 360° to 380° F. for the entire length of the vessel, and dumps the product at the opposite end of entry. The amount of required contact time with the heated oil is determined by the type of product, or product mix being loaded into the cooker.

The cooking vat is designed such that oil is circulated through the vat at a rate of approximately 680 to 860 gallons per minute (gpm) to allow for the rapid removal of fat and moisture from skin and meat in a continuous process. The volume of oil in the cooking vat is approximately 4,500 gallons. Additional inlets and outlets for oil may be added to the vat to allow for the tremendous flow of oil required to maintain a frying temperature.

Step one of the cooking process is the loading of product into the vat. This is accomplished with an elevated conveyor that delivers the product to be cooked at a continuous rate. This rate can be varied by the implementation of a variable speed control panel. Speed variance at this point will allow a controlled loading of the cooking vat, therefore allowing the cooking time to be adjusted according to an assorted supply of products.

After the product is delivered to the tank a series of paddles move the cooking product the entire length of the vat. The paddles are connected to a drive chain that is driven by a constantly variable speed hydraulic drive unit. Paddles and chains are guided by a continuous length set of guides, made up of stainless steel angles.

The chain is led into the guides by a set of eight large cog wheels, two driven and six idlers. The idlers on the top of the tank are connected together and the lower idlers run independent of each other. As the chains and paddles emerge from the discharge end of the tank, the cooked product is dumped from the vat into a conveyor to carry it onto the next step of the process. Paddles return to the beginning of the process along slides mounted on the top of the tank.

The product is cooked through a direct contact with heated oil. This oil is approximately three feet deep in the vat. Oil is circulated through the tank at a preferable temperature of 380 degrees and at a preferable velocity of 860 gpm. The oil enters the vat through a series of inlet pipes on both sides of the tank. These six inch diameter lines enter the tank at a 22½ degree angle, canted towards the discharge end of the vat. The angle of the pipes will assist in moving oil from one end on through the vat.

Oil is removed from the vat through a ten inch diameter pipe in the discharge end. To reduce the amount of solids entering the heat exchanger, a high speed rotating screen is installed on the discharge end to remove smaller particles. The rotating screen is cleaned by installation of an air line and a constant flow of air being discharged through the screen. Larger particles are contained in the vat with a screen. As the paddles pass this screen, a wiper strip attached to the bottom of each paddle, wipes away the product being drawn to the screen. The wiper strip includes a TEFLON non-stick coating.

Heated oil is removed from the vat and is later supplied back to the cooking vat via a pump station that delivers the oil through a cyclonic liquid filter to remove the suspended particles of cooked fat and on to a direct fired heat exchanger. From the heat exchanger, where the oil is preferably reheated to 380 degrees, the oil is returned to the cooking vat at a preferable rate of 860 gallons per minute.

The constant exchange of oil and the temperatures to which the oil is heated, are designed to improve the release of oil and fat from the product so that the moisture level is approximately 12% in the product and the fat content is broken down. Moisture is released into the atmosphere through a vented hood that covers the entire cooking vat. A continuous oil level is maintained by the implementation of a weir and strainer, where oil and fat are picked up, pumped through a Stein filter and then through a Star filter for cleaning and polishing and then pumped into a holding tank to await transporting.

The superior quality of the end product is due to the cooking method and temperatures maintained while cooking, in combination with the freshness maintained prior to cooking.

The solid product is conveyed out of the cooking vat into a screw auger and then transported to another screw auger. From the last mentioned screw auger, product is delivered to a hydraulic driven Dupps press which removes any excess oil above approximately 8% from the solids. Drain plugs exist under the screw augers to capture oil from solids during conveying periods. The captured oil is returned to the pump station. This process will help eliminate unnecessary oil going to the Dupps press.

Oil extracted by the Dupps press is pumped to a sedimentation tank. After a period of time, oil in the sedimentation tank is pumped to the Stein filter, Star filter, and on to the oil storage tank. Solids from the sedimentation tank are removed by a screw auger, and placed on another screw auger. At this point, solids are returned to the screw auger leading to the Dupps press and the process is repeated through the Dupps press and the sedimentation tank.

Solids from the Dupps press in the form of a ribbon-like product, are removed by an additional screw auger and placed on another screw auger. After a cooling process, the last mentioned screw auger delivers solids to a hammer mill. Inside the hammer mill, solids are crushed and ground to a fine meal. Finished meal will then be augured to a meal storage tank to await transporting. The protein content of the finished meal will be higher than regular poultry meal, and the ash content will be very low due to the absence of bone in the mix.

It is therefore another object of the present invention to process discarded pieces from a chicken slaughtering operation to produce a high quality, high protein chicken meal.

It is still another object of the present invention to cook discarded portions of a chicken slaughtering operation in a vat of heated oil, with the oil rapidly moved through the vat and with the chicken pieces being transported through the vat for removal of fat and moisture.

Still yet another object of the present invention involves the cooking of discarded portions of a chicken slaughtering operation in a vat having constantly circulated oil heated to a temperature in the range of 360° to 380° F., with oil being removed and input into the vat at a rate of 680 to 860 gallons per minute.

It is still yet another object of the present invention to remove moisture and fat from discarded portions of a chicken slaughtering operation by cooking the chicken portions in a vat of oil heated to a preferable temperature of 380° F. with the oil circulating through the vat at a preferable rate of 860 gallons per minute so as to ultimately produce a high quality, high protein chicken meal.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
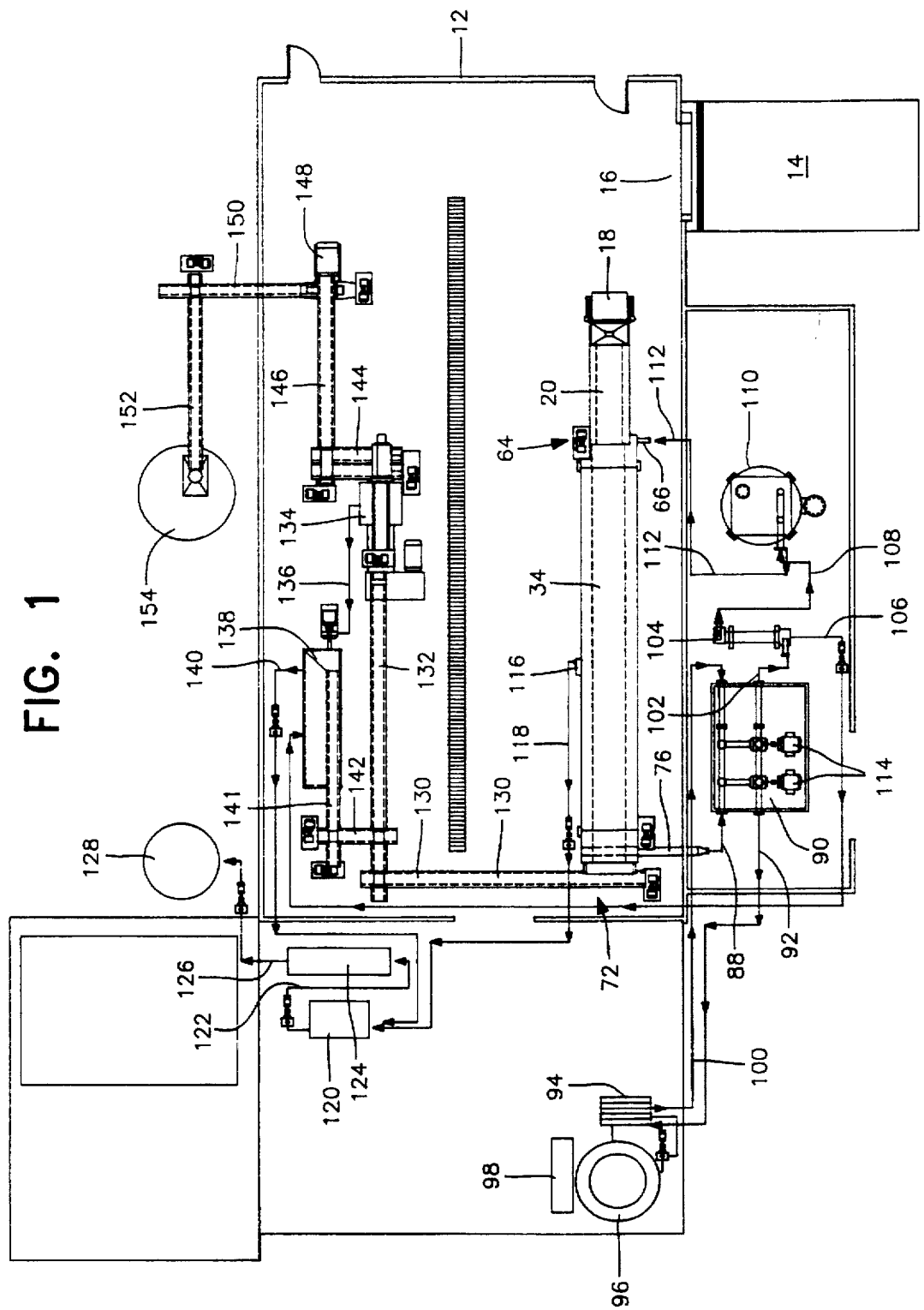
FIG. 1 is a schematic floor plan of the apparatus for performing the method of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIG. 1, in particular, a system for conducting a method of producing food grade poultry oil and meal is generally designated as 10. With reference to its orientation in FIG. 1, the required apparatus is primarily housed within a building 12 having a loading dock 14.

Discarded chicken portions from a chicken slaughtering operation are transported in portable containers by truck and delivered to building 12 at the truck dock 14 through entrance 16. The food product is maintained at a temperature below 55° F. to ensure food quality.

Figure 2:
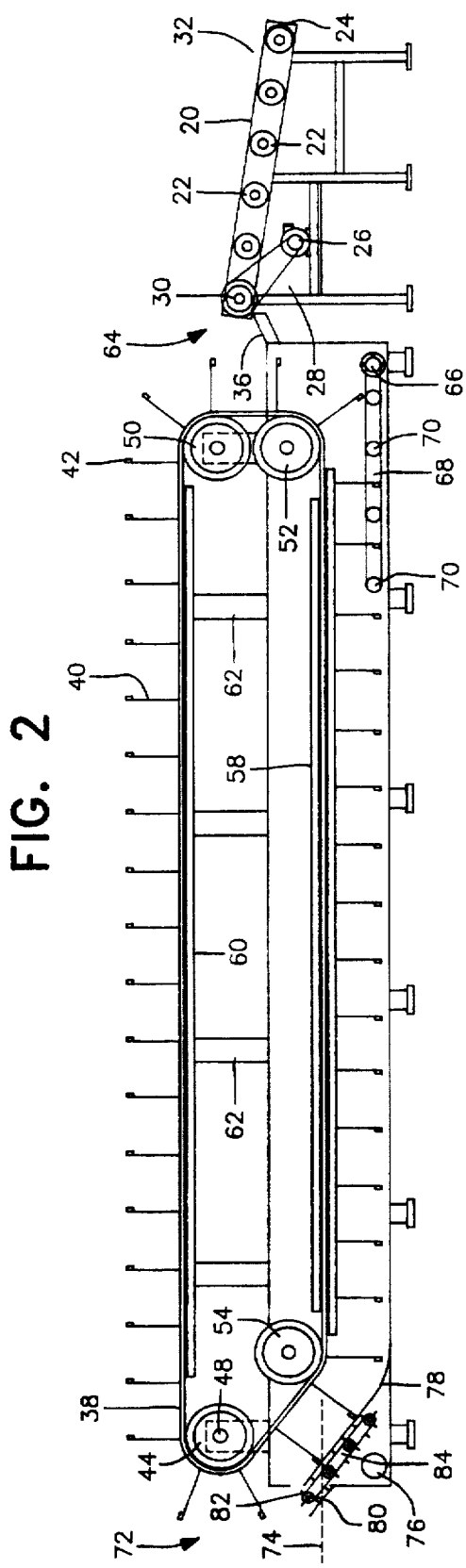
FIG. 2 is a sectional view of the cooking vat shown in FIG. 1.
Figure 3:
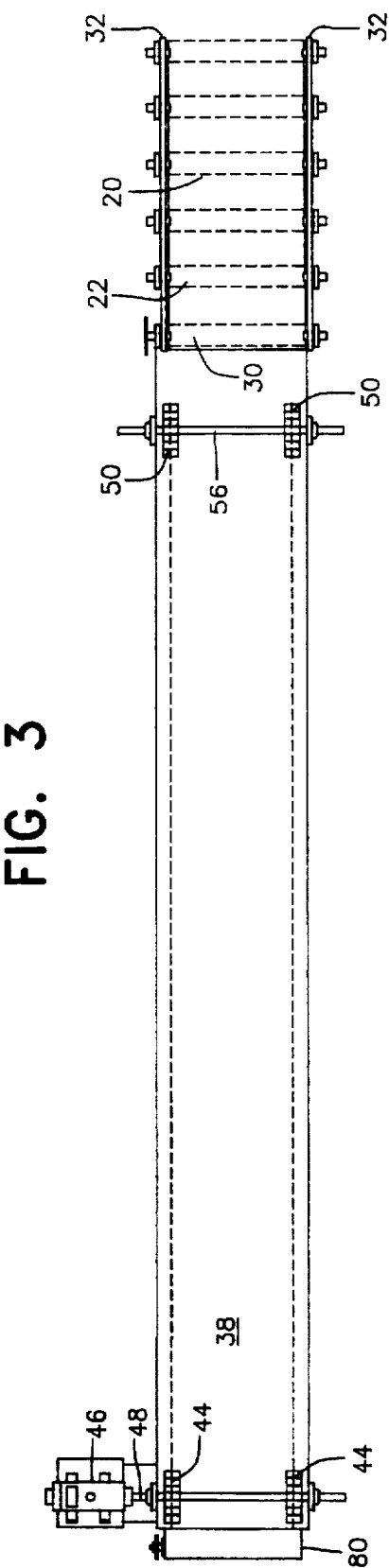
FIG. 3 is a plan view of the cooking vat shown in FIG. 2.
Figure 4:
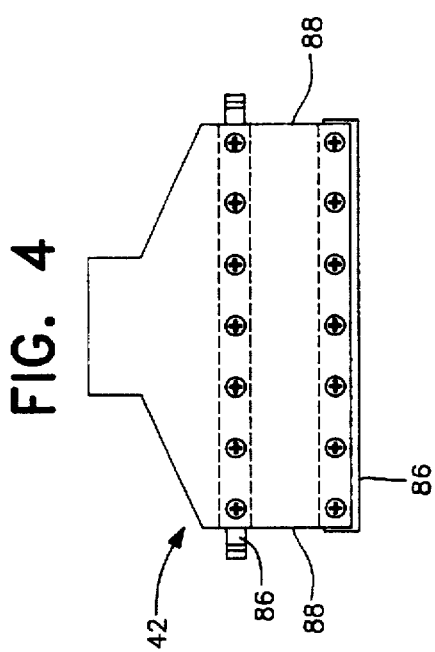
FIG. 4 is an enlarged plan view of the paddle shown in the cooking vat of FIG. 2.

The delivered food product is then transported to a dumper mechanism 18 which inverts the food containers and dumps its contents onto an inclined variable speed belt conveyer 20. The conveyer 20 as illustrated in FIGS. 2 and 3, includes a plurality of rollers 22 about which extends a continuous belt 24. The rollers 22 are driven by a motor 26 having a pulley 28 connected to a leading roller 30 so as to turn the belt 24 and convey food product between vertically rising guide walls 32.

The product moved by inclined conveyor 20 is dumped into the cooking vat 34 along guide 36. The cooking vat 34 includes a drive chain belt 38 to which are connected a plurality of equally spaced extension arms 40, terminating in paddles 42, for conveying food product through the cooking vat.

The chain belt 38 extends across the vat 34 and between two drive cog wheels 44 which are driven by a constantly variable speed, hydraulic drive unit 46 through a drive shaft 48 passing through the center of the drive cog wheels 44. The chain belt 38 is also passed around three sets of idler cog wheels 50, 52 and 54. The idler cog wheels 50 are connected together by a shaft 56 (similar to the arrangement for drive cog wheels 44) whereas the idler cog wheel sets 52 and 54 run independently of each other.

The chain belt 38 extending across the width of the cooking vat 34, passes, at its edges, between stainless steel angle guides 58, within the vat, which includes a layer of TEFLON nonstick coating. Above the cooking vat 34, the chain belt is guided by horizontally oriented support 60 braced above the vat by legs 62.

In the cooking vat 34, at its inlet end 64, is located a six inch diameter inlet pipe 66 which leads to an elongated pipe 68 having a plurality of openings 70, with a pipe 68 leading off of the inlet pipe 66 on opposite sides of the cooking vat. Heated oil passes through openings 70 in a direction towards the discharge end 72 of the cooking vat 34 at an angle of approximately 22.5°. Oil directed through the openings 70 will therefore be directed towards the discharge end and aid in conveying food product through the cooking vat, below the oil level 74, for total contact, heating and cooking of the food product being processed. At the discharge end 72 of the cooking vat 34, there is a 10 inch diameter outlet pipe 76 for removal of oil from the cooking vat.

As the paddles 42 move through the oil in the cooking vat, in the direction from the inlet end 64 to the discharge end 72, food product is conveyed up along a screen 78 located at the discharge end 72. Smaller particles of food product and/or fat passing through the screen encounter a high speed rotating screen 80 having short projections 82 to move the smaller particles passing through screen 78 so as to prevent the small particles from entering the outlet pipe 76. The rotating screen 80 is cleaned by an air line outlet 84 which provides a constant flow of air discharged through the screen.

As the paddles pass over the screen 78, a TEFLON no-stick coating wiper strip 86, wipes product being drawn to the screen to the discharge end 72 of the cooking vat. It is understood as being within the scope of the present invention to have a plurality of paddles 42 spaced laterally across the chain conveyor 38 so as to move food product through the cooking vat. Each of the paddles 42 may be interconnected by projections 86 extending laterally from the side edges of the paddles 42.

Returning to FIG. 1, in the operation of the cooking vat 34, oil withdrawn from outlet pipe 76 is conveyed by conduit 88 to a pump station 90. The pump station divides a small portion of the heated oil from the main supply of extracted oil and passes this small oil portion through conduit 92, to a heat exchanger 94 which transfers some of the heat from the oil to heat water to be stored in a hot water tank 96. The hot water tank 96 is used with a high pressure pump 98 in a cleaning operation of the apparatus of the present invention. After transfer of heat in heat exchanger 94 to water to be stored in tank 96, the oil is returned by conduit 100 to the pump station 90.

The majority of oil withdrawn through outlet pipe 76 and the oil returned by conduit 100 back to the pump station 90 is transferred by conduit 102 to a LATCO cyclonic liquid filter 104 for removal of suspended particles of cooked fat in the oil. The cooked fat particles separated from the oil are transferred by conduit 106 for subsequent processing.

The filtered oil is then transferred by conduit 108, to a direct fired heat exchanger 110. At the heat exchanger 110, the oil is heated to a temperature in the range of 360° to 380°, and preferably 380°. The heated oil is then transferred by conduit 112 to the inlet pipe 66 at the inlet end 64 of the cooking vat 34.

The pumps 114 in the pumping station 90 withdraw oil from the cooking vat and return oil to the cooking vat at a rate of 680 to 860 gpm. This very rapid movement of oil through the cooking vat, at elevated temperatures, provides for a high protein content meal due to the removal of moisture and fat from the chicken pieces being processed.

In addition, a continuous oil level is maintained by a weir and strainer 116 which siphons oil and fat from an upper surface of the oil in the cooking vat and transfers the extracted oil and fat through conduit 118. Conduit 118 passes to a STEIN filter 120 and then through conduit 122 to a STAR filter 124 for cleaning and polishing of the oil prior to the oil being conveyed through conduit 126 to an oil storage tank 128.

Returning to the further processing of the food product conveyed through the cooking vat 34 by paddles 42 and the force of heated oil directed towards the discharge end 72, the solid product is conveyed by a screw auger conveyor 130 in a direction perpendicular to the direction of extension of the cooking vat 34. The solid product is delivered to another screw auger conveyor 132 which extends perpendicular to the conveyor 130. Excess oil is allowed to drain from the solid product as the product is conveyed along conveyors 130 and 132.

The solid product is then delivered to a press 134 which compresses the solid product to remove any excess oil. The oil removed by the press 130 is conveyed by conduit 136 to a sedimentation tank 138. In addition, the suspended particles of cooked fat removed by the filter 104 are conveyed through conduit 106 to the sedimentation tank 138 for further processing. Oil separated from solid product in the sedimentation tank is removed by conduit 140 and delivered to the filters 120 and 124 for ultimate delivery to the storage tank 128.

The solid product from the sedimentation tank is moved by screw auger conveyor 141 to another screw auger conveyor 142 and return delivery back to the screw auger 132 and return delivery to the press 134. The recycling of solid product through the press 134 ensures maximum oil removal from the solid product.

Solid product produced by the press 134 is transferred by screw auger conveyor 144 to screw auger conveyor 146 and delivery to a hammer mill 148. At hammer mill 148, dry solid product is crushed and ground into a fine chicken meal.

The chicken meal is conveyed by screw auger conveyors 150 and 152 to a meal storage tank 154.

By the method using the apparatus described, a high quality food product is produced with a high protein content. This superior product results from the continuous extraction of fat and moisture by cooking in high temperature oil with continuous subsequent removal of the oil from the cooked food product.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A process of removing fat, edible oil and moisture from scrap chicken parts, said process comprising:
   cooking the scrap chicken parts in a vat of cooking oil heated to a temperature in the range of 360° to 380° F.,
   transporting the scrap chicken parts through the vat of cooking oil,
   removing the cooking oil from the vat and reheating the cooking oil prior to returning the cooking oil to the vat at an elevated temperature,
   removing the cooked scrap chicken parts from the vat,
   pressing the cooked scrap chicken parts to remove poultry oil, and
   breaking up the pressed and cooked scrap chicken parts to form a high protein, low ash content chicken meal.

2. A process according to claim 1, wherein the oil is returned to the vat at a rate of 680 to 860 gallons per minute.

3. A process according to claim 1, wherein the oil is returned to the vat in a direction which is in the same direction as the chicken parts are transported through the vat.

4. A process according to claim 1, wherein oil is siphoned off from an upper surface of the oil to remove fat released by the chicken parts.

5. A process according to claim 1, wherein a conveyor having paddles transports the chicken parts through the vat.

6. A process according to claim 1, wherein oil is removed from a discharge end of the vat and oil is returned to an inlet end of the vat.

7. A process as claimed in claim 1, wherein the breaking up of the pressed and cooked scrap chicken parts is performed by crushing and grinding.

8. A process as claimed in claim 1, wherein the pressed and cooked scrap chicken parts are cooled prior to breaking up.

9. A process as claimed in claim 1, where scrap chicken parts are delivered into the vat at a temperature below 55° F.

10. A process as claimed in claim 1, wherein scrap chicken parts containing bone and gristle are processed through a rough chopper or screen prior to cooking.

11. A process of removing fat, edible oil and moisture from scrap chicken parts, said process comprising:
    cooking the scrap chicken parts in a vat of cooking oil heated to a temperature in the range of 360° to 380° F.,
    transporting the scrap chicken parts through the vat of cooking oil,
    removing the cooking oil from the vat and reheating the cooking oil prior to returning the cooking oil to the vat at an elevated temperature,
    removing the cooked scrap chicken parts from the vat,
    pressing the cooked scrap chicken parts to remove poultry oil, breaking up the pressed and cooked scrap chicken parts to form a high protein chicken meal, conveying the poultry oil to a sedimentation tank for processing for a predetermined amount of time, removing the poultry oil from the sedimentation tank after the predetermined amount of time, and cleaning and polishing the removed poultry oil to form food grade poultry oil.

12. A process of removing fat, edible oil and moisture from scrap chicken parts, said process comprising:

cooking the scrap chicken parts in a vat of cooking oil heated to a temperature in the range of 360° to 380° F., transporting the scrap chicken parts through the vat of cooking oil, removing the cooking oil from the vat and reheating the cooking oil prior to returning the cooking oil to the vat at an elevated temperature, removing the cooked scrap chicken parts from the vat, pressing the cooked scrap chicken parts to remove poultry oil, and breaking up the pressed and cooked scrap chicken parts to form a high protein chicken meal, filtering the removed cooking oil to remove suspended particles of cooked chicken fat, conveying the cooked chicken fat obtained by filtering the cooking oil to a sedimentation tank for processing for a predetermined amount of time, the sedimentation tank including poultry oil obtained from pressing cooked scrap chicken parts removed from the vat, removing the poultry oil from the sedimentation tank after the predetermined amount of time, and cleaning and polishing the removed poultry oil to form food grade poultry oil.

13. A process of removing fat, edible oil and moisture from scrap chicken parts, said process comprising:

cooking the scrap chicken parts in a vat of cooking oil heated to a temperature in the range of 360° to 380° F., transporting the scrap chicken parts through the vat of cooking oil, withdrawing poultry oil from an upper surface of the cooking oil, cleaning and polishing the withdrawn poultry oil to form food grade poultry oil, removing the cooking oil from the vat and reheating the cooking oil to returning the cooking oil to the vat at an elevated temperature, removing the cooked scrap chicken parts from the vat, and breaking up the pressed and cooked scrap chicken parts to form a high protein, low ash content chicken meal.

14. A process of removing fat, edible oil and moisture from scrap chicken parts, said process comprising:

cooking the scrap chicken parts in a vat of cooking oil heated to a temperature in the range of 360° to 380° F., transporting the scrap chicken parts through the vat of cooking oil, removing the cooking oil from the vat and reheating the cooking oil prior to returning the cooking oil to the vat at an elevated temperature, removing the cooked scrap chicken parts from the vat, pressing the cooked scrap chicken parts to remove poultry oil, breaking up the pressed and cooked scrap chicken parts to form a high protein chicken meal, conveying the poultry oil to a sedimentation tank for processing for a predetermined amount of time, removing the poultry oil from the sedimentation tank after the predetermined amount of time, cleaning and polishing the removed poultry oil to form food grade poultry oil, removing solid product from the sedimentation tank, pressing the removed solid product and crushing and grinding the pressed product to form a high protein chicken meal.

* * * * *